United States Patent
Ozalevli et al.

(10) Patent No.: US 11,342,842 B2
(45) Date of Patent: May 24, 2022

(54) PULSE FREQUENCY MODULATION AND FREQUENCY AVOIDANCE METHOD AND IMPLEMENTATION FOR SWITCHING REGULATORS

(71) Applicant: Apple Inc., Cupertino, CA (US)

(72) Inventors: Erhan Ozalevli, Santa Clara, CA (US); Yanhui Xie, Cupertino, CA (US); Dharmesh C. Bhagatwala, Cupertino, CA (US)

(73) Assignee: Apple Inc., Cupertino, CA (US)

(*) Notice: Subject to any disclaimer, the term of this patent is extended or adjusted under 35 U.S.C. 154(b) by 156 days.

(21) Appl. No.: 16/805,577

(22) Filed: Feb. 28, 2020

(65) Prior Publication Data
US 2021/0273562 A1  Sep. 2, 2021

(51) Int. Cl.
*H02M 3/158* (2006.01)
*H02M 1/44* (2007.01)
*H02M 1/00* (2006.01)

(52) U.S. Cl.
CPC ............. *H02M 3/158* (2013.01); *H02M 1/44* (2013.01); *H02M 1/0032* (2021.05)

(58) Field of Classification Search
CPC ............ H02M 1/0003; H02M 1/0009; H02M 1/0025; H02M 1/0032; H02M 1/15; H02M 1/44; H02M 3/156; H02M 3/15
See application file for complete search history.

(56) References Cited

U.S. PATENT DOCUMENTS

| | | | | |
|---|---|---|---|---|
| 7,221,129 B2 * | 5/2007 | Matsuo | ................. | H02M 3/158 323/222 |
| 7,579,820 B2 * | 8/2009 | Hane | ..................... | H02M 1/08 323/284 |
| 8,058,859 B2 | 11/2011 | Xu | | |
| 8,358,118 B2 * | 1/2013 | Chen | .................... | H02M 3/156 323/285 |
| 8,810,227 B2 | 8/2014 | Flaibani et al. | | |
| 2015/0229212 A1 * | 8/2015 | Shiwaya | ............... | H02M 3/158 323/282 |
| 2017/0033811 A1 * | 2/2017 | Heo | .......................... | H03F 3/24 |
| 2019/0081546 A1 * | 3/2019 | Hsu | ...................... | H02M 3/158 |
| 2019/0238054 A1 | 8/2019 | Flaibani et al. | | |
| 2020/0127561 A1 * | 4/2020 | Takada | .................. | H02M 3/156 |

* cited by examiner

*Primary Examiner* — Matthew V Nguyen
(74) *Attorney, Agent, or Firm* — Fenwick & West LLP (57) ABSTRACT

Embodiments relate to a switching regulator having a dual mode control. The switching regulator includes an error amplifier configured to receive an output voltage of a power source, and to generate an error voltage based on a difference between the output voltage of the power source and a reference voltage. The switching regulator additionally includes a PFM controller configured to receive the error voltage from the error amplifier, and to generate a clock signal having a switching frequency based on a difference between the error voltage and a modulation voltage. Moreover, the switching regulator includes a PWM controller configured to receive the clock signal and an error signal determined based on a load current sensed at an output of the power source, and to generate a control signal to control the power source.

20 Claims, 9 Drawing Sheets

PULSE FREQUENCY MODULATION AND FREQUENCY AVOIDANCE METHOD AND IMPLEMENTATION FOR SWITCHING REGULATORS

BACKGROUND

1. Field of the Disclosure

The present disclosure relates switching regulators and more specifically to a switching regulator controlled using pulse frequency modulation and frequency avoidance.

2. Description of the Related Arts

Switch-mode power supplies (SMPS) are designed to transfer power from a direct current (DC) source to a DC load, while converting voltage and/or current characteristics of the DC source. Switch-mode power supplies, unlike linear power supplies, continually switches (or transitions) between low-dissipation states and high-dissipation states, reducing waste of energy. Voltage regulation in the SMPS is achieved by changing the ratio of on-to-off times. Conventionally, the control of the on-to-off times is performed using pulse-width-modulation (PWM). However, since a PWM control scheme uses a constant number of switching actions for a set time frame, regardless of the load level, switching losses do not scale with load current. As a result, at light loads, the switching loss becomes predominant, significantly reducing the efficiency of the SMPS.

SUMMARY

Embodiments relate to a switching regulator having a dual mode control. In particular, the switching regulator combines a pulse-width-modulation (PWM) control scheme with a pulse-frequency-modulation (PFM) control scheme. The switching regulator includes an error amplifier that receives an output voltage of a power source, and generates an error voltage based on a difference between the output voltage of the power source and a reference voltage. The switching regulator additionally includes a PFM controller that receives the error voltage from the error amplifier, and generates a clock signal having a switching frequency based on a difference between the error voltage and a modulation voltage. Moreover, the switching regulator includes a PWM controller that receives the clock signal and an error signal determined based on a load current sensed at an output of the power source, and generates a control signal to control the power source.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a switching regulator having a dual mode control. In particular, the switching regulator combines a pulse-width-modulation (PWM) control scheme with a pulse-frequency-modulation (PFM) control scheme. Under light load conditions, instead of further reducing the duty cycle of the control signal, the frequency of the control signal is decreased according to the PFM control scheme. Since the frequency of the control signal is changed, even if the on-time of the control signal is left unaltered, the on-to-off ratio of the signal is further decreased. During the light load operation, the output power is proportional to the average frequency of the control signal.

The PWM control scheme offers the benefit of predictable operating frequency, which may simplify the design of the circuitry that suppresses electromagnetic interference (EMI). Moreover, the PWM control scheme offers low output ripple characteristics and high efficiency during moderate to high load conditions. The PFM operating mode allows for increased efficiency for low load conditions. However, since under certain circumstances, the frequency of the control signal may change, to avoid operating the switching regulator in certain frequency bands (e.g., the audible frequency band), a frequency avoidance control scheme is also implemented.

The switching regulator includes an error amplifier that receives an output voltage of a power source, and to generate an error voltage based on a difference between the output voltage of the power source and a reference voltage. The switching regulator additionally includes a PFM controller that receives the error voltage from the error amplifier, and to generate a clock signal having a switching frequency based on a difference between the error voltage and a modulation voltage. Moreover, the switching regulator includes a PWM controller that receives the clock signal and an error signal determined based on a load current sensed at an output of the power source, and to generate a control signal to control the power source.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
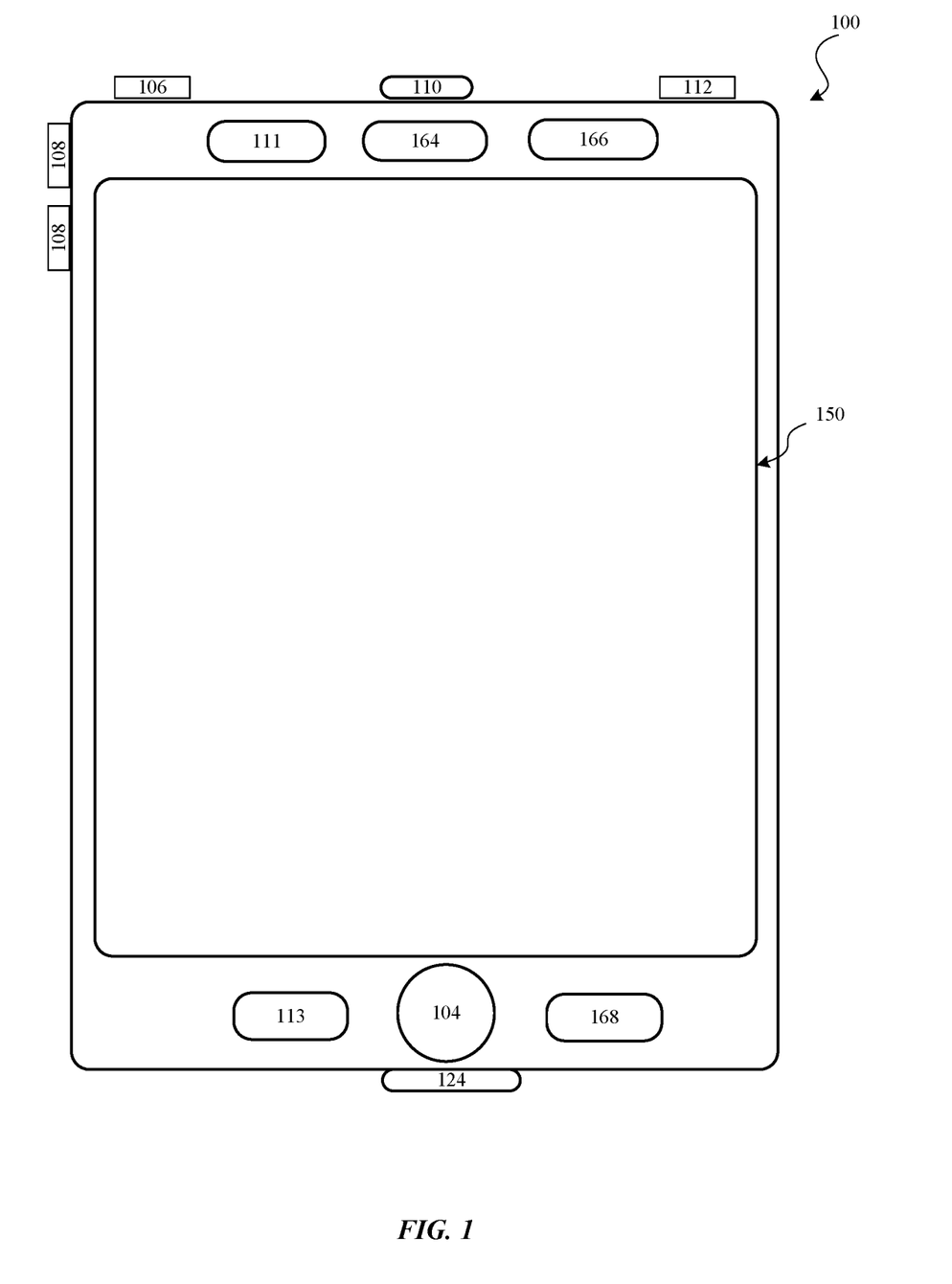
FIG. 1 is a high-level diagram of an electronic device, according to one embodiment.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). Device 100 may include one or more current sense circuits described herein.

Example Peak Current Mode Buck Regulator

Figure 2:
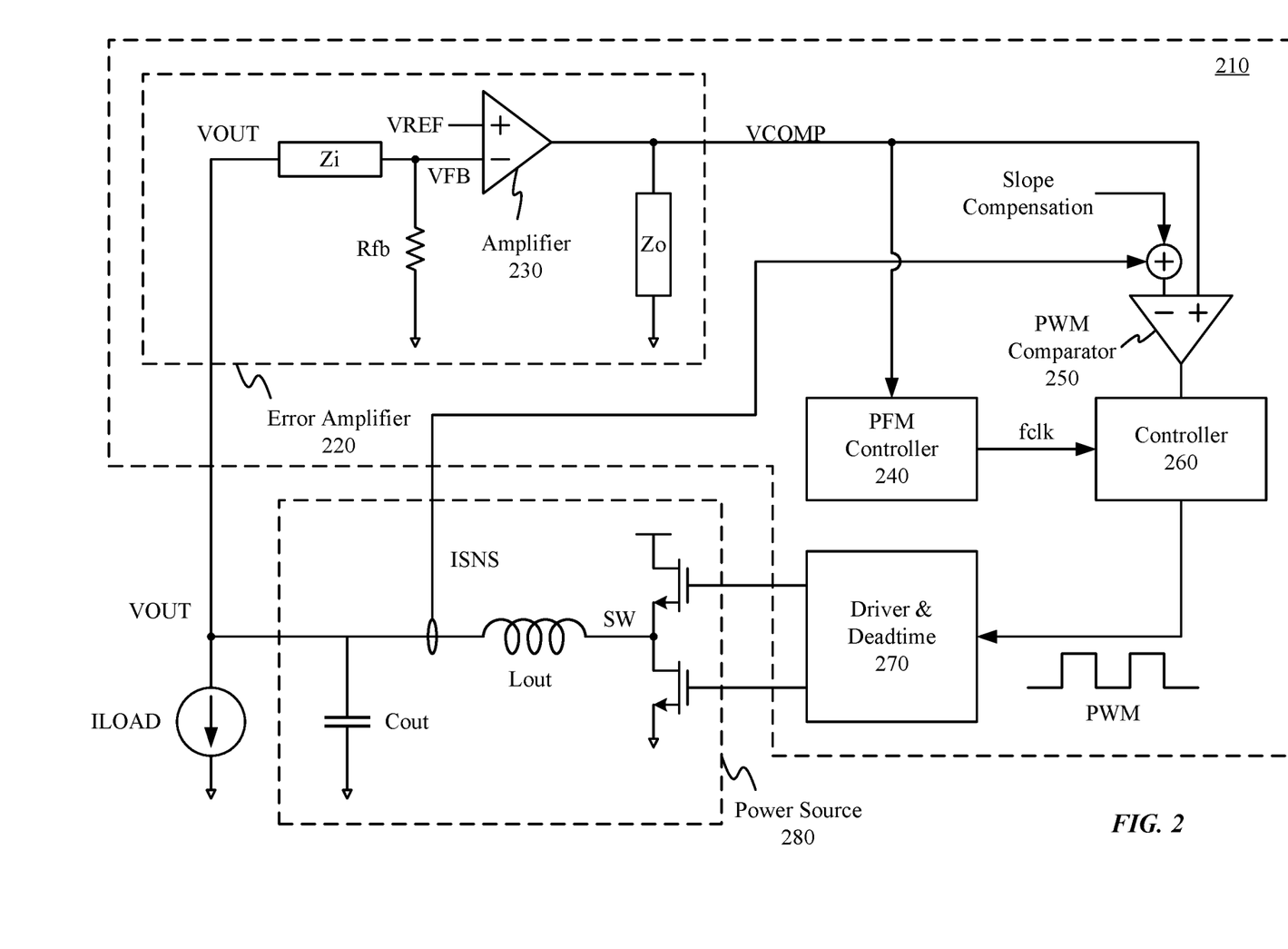
FIG. 2 is a block diagram illustrating a current mode buck regulator, according to one embodiment.

FIG. 2 is a block diagram illustrating a peak current mode buck regulator 210, according to one embodiment. The peak current mode buck regulator 200 includes an error amplifier 220, a pulse-frequency-modulation (PFM) controller 240, a pulse-width-modulation (PWM) comparator 250, a controller 260, and a driver & deadtime module 270. The peak current mode buck regulator 210 is coupled to a power source 280. In some embodiments, the power source 280 is a buck converter.

The peak current mode buck regulator 210 is a circuit that generates control signals to control the operation of the power source 280. The power source 280 then generates an output voltage VOUT and an output current ILOAD to drive a load connected to the output of the power source 280.

The peak current mode buck regulator 210 is a circuit that includes an error amplifier 220 that receives as an input the output voltage VOUT of the power source 280 and generates an error voltage VCOMP. In some embodiments, the error amplifier 220 includes a differential amplifier 230, a compensation networking having an input impedance portion Zi at the input of the differential amplifier 230 and an output impedance portion Zo at the output of the differential amplifier 230, and a feedback resistor Rfb. The differential amplifier 230 receives as an input a reference voltage VREF and a feedback voltage VFB, and generates the error voltage VCOMP based on a difference between the reference voltage VREF and the feedback voltage VFB. The output of the error amplifier 220 is provided to the PWM comparator 250.

The PWM comparator 250 compares the error voltage VCOMP and the current ISNS sensed from the output of the power source 280. The output of the PWM comparator 250 is then fed to controller 260. Controller 260 generates a PWM signal used to control power source 280. In some embodiments, the PWM signal generated by the controller 260 is provided to a driver & deadtime module 270, which generates control signals to turn on and off various switches of the power source 280. In one embodiments, a slope compensation signal is added to the sensed current ISNS before being provided to the PWM comparator 250.

The output of the error amplifier 220 is further coupled to the PFM controller 240. The PFM controller 240 monitors the output of the error amplifier. The PFM controller 240 is activated when the error voltage VCOMP reaches below a predetermined level. The PFM controller 240 modulates the switching frequency of the controller 260 when the error voltage VCOMP drops below the predetermined voltage level. In particular, during steady state operation, if the output voltage VOUT of the power source 280 increases above a target level, it can be determined that the current delivered by the switching regulator is more than the output load current ILOAD. As the duty cycle of the PWM clock decreases and reaches a lower threshold value, if load current further reduces, then frequency modulation is used to reduce the average current per cycle to maintain the output regulation by reducing the PWM clock frequency.

Although the embodiment of FIG. 2 was described with reference to buck converter, the same principle can be applied to other switch-mode power supply (SMPS) topologies such as boost, buck-boost, or any other SMPS topology.

Figure 3:
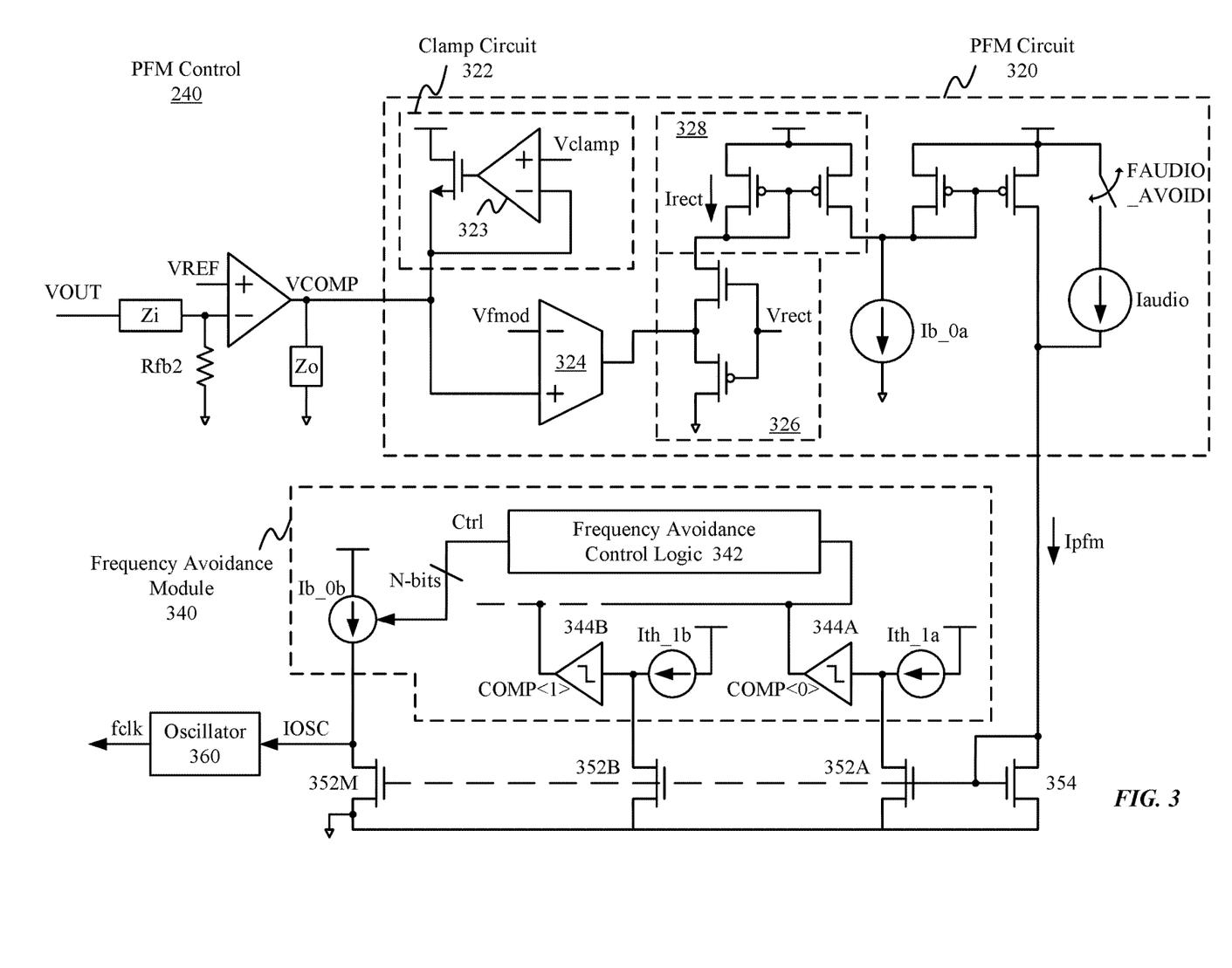
FIG. 3 is a circuit diagram, illustrating the pulse-frequency-modulation (PFM) controller of FIG. 2, according to one embodiment.

FIG. 3 is a circuit diagram, illustrating the PFM controller 240 of FIG. 2, according to one embodiment. The PFM controller 240 includes a PFM circuit 320, a frequency avoidance module 340, an oscillator 360, transistor 354, and current mirrors 352A-M.

In some embodiments, the PFM circuit 320 includes a clamp circuit 322 to clamp the value of VCOMP. That is, the clamp circuit 322 limits the minimum voltage level of VCOMP to Vclamp. If the error voltage VCOMP drops below Vclamp, the operational amplifier 323 of the clamp circuit 322 turns on a switch to provide a current to increase the value of the error voltage VCOMP. The operational amplifier 323 generates an output when the error voltage VCOMP drops below Vclamp, which in turn, increases the error voltage VCOMP.

The PFM circuit 320 includes a transconductance amplifier 324, a rectifier 326, and a current subtractor 328. The transconductance amplifier receives the error voltage VCOMP from the error amplifier and generates an output based on the difference between a modulation voltage Vfmod and the error voltage VCOMP. In some embodiments, the transconductance amplifier generates a current based on the difference between the modulation voltage Vfmod and the error voltage VCOMP. In some embodiments, the PFM circuit 320 only operates when the error voltage VCOMP is below the modulation voltage Vfmod. When the error voltage VCOMP is above the modulation voltage Vfmod, the value of Ipfm is kept at $Ib\_0a$ (or $Ib\_0a+Iaudio$), and thus, the switching frequency is not modulated.

The output of the transconductance amplifier 324 is provided to a rectifier 326. The rectifier 326 rectifies the current generated by the transconductance amplifier 324. The rectified current Irect is provided to a current subtractor 328. The rectified current is then subtracted from the oscillator bias current $Ib\_0a$ to reduce the switching frequency. In some embodiments, the current subtractor includes a current mirror having the bias current $Ib\_0a$ at an output branch and receiving the rectified current Irect at an input branch. In some embodiments, an audio bias current Iaudio is added to the rectified current to avoid the audio frequency band. In some embodiments, the PFM circuit 320 includes a switch controlled by a control signal FAUDIO_AVOID to selectably add the audio bias current from the rectified current. In some embodiments, the resulting current Ipfm is equal to:

$$Ipfm = Ib\_0a - Irect + Iaudio \qquad (1)$$

The frequency avoidance module 340 compares the resulting current Ipfm to predetermined fixed bias currents $Ith\_1a$, $Ith\_1b$, etc. to determine if the oscillator clock frequency reaches any of the stop band frequencies. When a determination is made that the switching frequency of the oscillator reaches any of the stop bands, the frequency avoidance module 340 increases or decreases the oscillator current by a predetermined amount to change the frequency of the oscillator out of the stop bands.

In some embodiments, the current Ipfm is provided to the frequency avoidance module 340 using multiple current mirrors 352A-M. In the embodiment of FIG. 3, a transistor 354 is connected to current mirrors 352A-M. In particular, each of the gates of the current mirrors 352A-M are connected to the gate of transistor 354. Each of the current mirrors 352A-M mirrors the current ipfm provided to transistor 354 and provides the mirror current to a corresponding section of the frequency avoidance module 340.

For example, the current Ipfm is compared to currents $Ith\_1a$, $Ith\_1b$ corresponding to a first stop band. Each of the currents $Ith\_1a$, $Ith\_1b$, corresponds to the current that would configure the oscillator 360 to generate a clock signal with a frequency corresponding to the first stop band. That is, the stop band current $Ith\_1a$ is a current that would configure the oscillator 360 to generate a clock signal with a frequency corresponding to an upper bound of the first stop band, and the stop band current $Ith\_1b$ is a current that would configure the oscillator 360 to generate a clock signal with a frequency corresponding to a lower bound of the first stop band. Similarly, the current Ipfm may be compared to a stop band currents $Ith\_2a$ and $Ith\_2b$ corresponding to the upper bound and the lower bound of a second stop band.

The comparators 344 receive a difference between the current Ipfm and a corresponding stop band current $Ith\_1a$, $Ith\_1b$, etc. and determines whether the difference indicates that Ipfm is lower or greater than the corresponding stop band current. If the difference indicates that the current Ipfm is above the stop band current, the comparator 344 generates a signal having a first value (e.g., HI or 1). If the difference indicates that the current Ipfm is below the stop band current, the comparator 344 generates a signal having a second value (e.g., LO or 0).

For example, the comparator 344A receives the difference between current Ipfm and stop band current $Ith\_1a$. If Ipfm is greater than $Ith\_1a$, the comparator 344A generates a signal COMP<0> having the first value. If Ipfm is smaller than $Ith\_1a$, the comparator 344A generates a signal than $Ith\_1a$, the comparator 344A generates a signal COMP<0> having the second value. Similarly, the comparator 344B receives the difference between current Ipfm and stop band current $Ith\_1b$. If Ipfm is greater than $Ith\_1b$, the comparator 344B generates a signal COMP<1> having the first value. If Ipfm is smaller than $Ith\_1b$, the comparator 344B generates a signal COMP<1> having the second value. Based on the values of COMP<0> and COMP<1>, a determination can be made whether the current Ipfm corresponds to a current that would configure oscillator 360 to generate a clock signal with a frequency in the first stop band. That is, if COMP<0> has the second value (i.e., Ipfm<$Ith\_1a$), and COMP<1> has the first value (i.e., Ipfm>$Ith\_1b$), then it can be determined that Ipfm corresponds to a current that would configure oscillator 360 to generate a clock signal with a frequency in the first stop band.

The outputs COMP<0:N> of each of the comparators 344 are provided to the frequency avoidance control logic 342. The frequency avoidance control logic 342 then generates a signal to configure current source $Ib\_0b$ to generate a current having a specific value. An oscillator current IOSC is generated based on Ipfm and $Ib\_0b$ and is then provided to the oscillator 360. The oscillator 360 generates a clock signal fclk based on the value of IOSC.

In some embodiments, the frequency avoidance control logic 342 configures the current source $Ib\_0b$ to generate a current having a specific value when the frequency avoidance control logic 342 determines that the current Ipfm is between values corresponding to a stop band for at least a detection time Tdetect. For example, if the frequency avoidance control logic 342 determines that Ipfm is between $Ith\_1b$ and $Ith\_1a$ for at least a time period equal to Tdetect, the frequency avoidance control logic 342 generates a control signal Ctrl to configure the current source $Ib\_0b$ to generate a current equal to either $Ith\_1b$ or $Ith\_1a$. The detection time Tdetect can be set to any value such that the control logic does not react when the switching frequency is simply transitioning through the stop band and not trying to stay in the stop band.

In some embodiments, when current Ipfm is detected to be within values corresponding to a stop band, the frequency avoidance control logic 342 activates the current source Ib_0b to increase or decrease the oscillator current IOSC by a predetermined value to change the switching frequency to a value outside of the stop band. In this embodiment, the value of the oscillator current IOSC is equal to the sum (or difference depending on the polarity) of currents Ipfm and Ib_0b. In some embodiments, Ib_0b is used as a hysteresis current added to Ipfm to avoid the oscillator from operating within stop bands.

In other embodiments, the frequency avoidance control logic 342 deactivates the current source Ib_0b when the current Ipfm is not within values corresponding a stop band. As such, the oscillator current IOSC is equal to the current Ipfm. However, when the current Ipfm is within values corresponding to a stop band, the frequency avoidance control logic 342 generates a control signal to activate current source Ib_0b to override the current Ipfm.

Figure 4A:
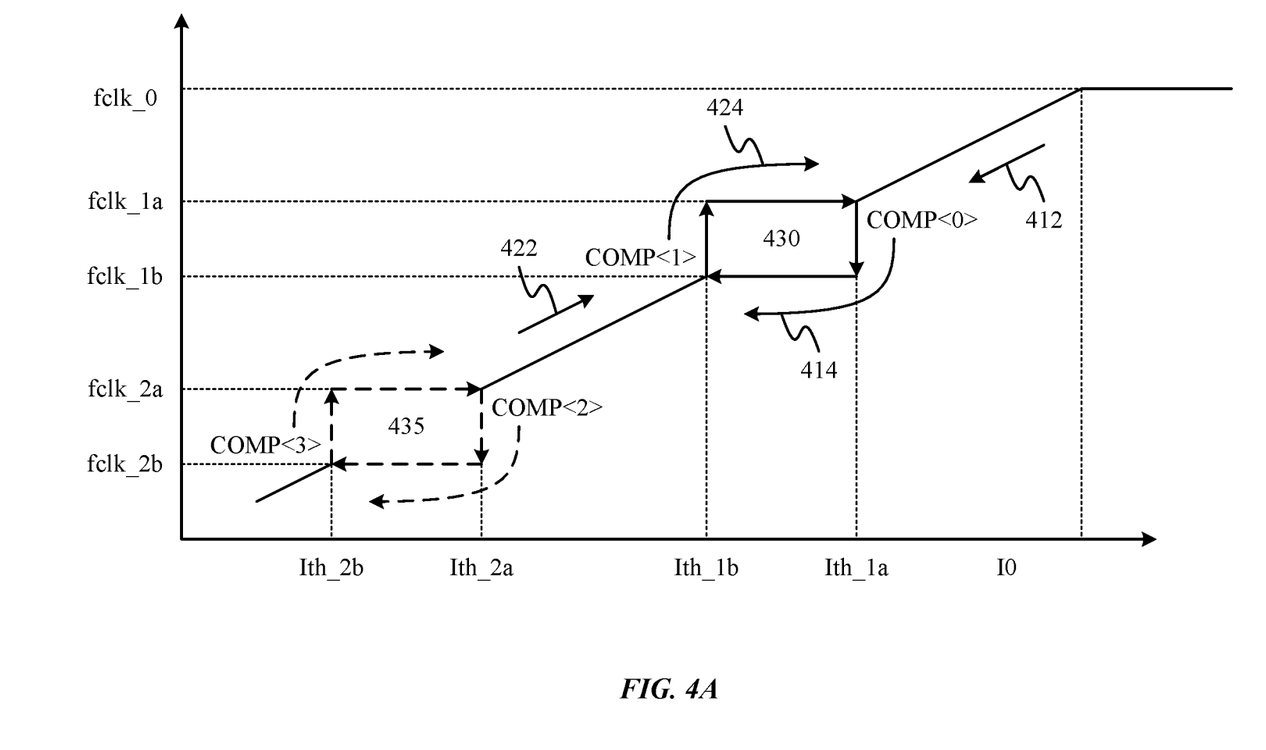
FIG. 4A is a graph illustrating a control scheme for the frequency avoidance method having two stop bands, according to one embodiment.

FIG. 4A is a graph illustrating a control scheme for the frequency avoidance method having two stop bands 430 and 435, according to one embodiment. The first stop band 430 corresponds to frequencies between fclk_1a and fclk_1b, and the second stop band 435 corresponds to frequencies between fclk_2a and fclk_2b. As the value of the load current Iload decreases 412, the value of the current Ipfm decreases accordingly. When the value of the current Ipfm reaches Ith_1a from a value higher the Ith_1a, the frequency avoidance method lowers 414 the value of oscillator current IOSC to Ith_1b until the value of current Ipfm moves outside of the range between Ith_1a and Ith_1b. In this manner, the frequency avoidance method prevents the oscillator from operating in a manner that would produce a clock signal with a frequency within the first stop band.

Figure 4B:
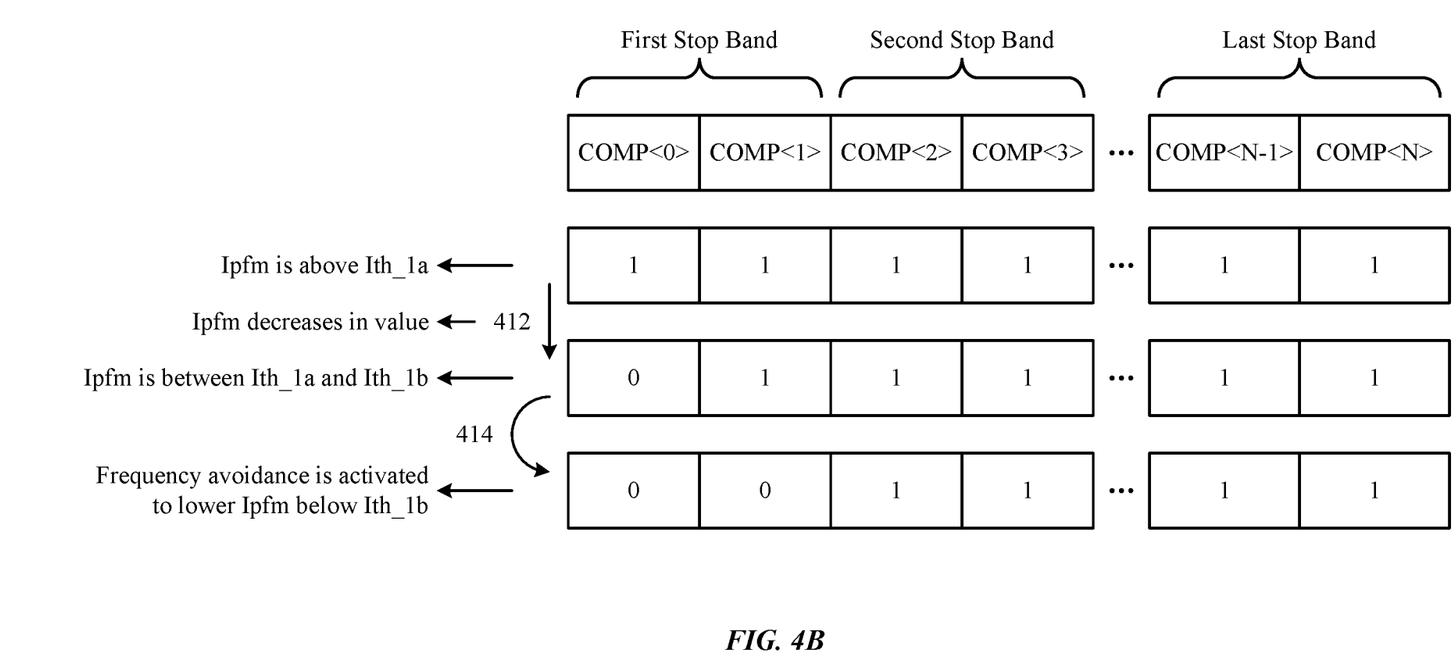
FIG. 4B is a diagram illustrating the value operation of the frequency avoidance control logic as the current oscillator current decreases from above an upper boundary of the first stop band to the first stop band, according to one embodiment.

FIG. 4B is a diagram illustrating the value operation of the frequency avoidance control logic 342 as the current oscillator current IOSC decreases from above Ith_1a to the first stop band 430, according to one embodiment. As the load current decreases and the switching frequency of the clock signal fclk decreases, the value of current Ipfm reaches the Ith_1a corresponding to the upper boundary of the first stop band 430. When the current Ipfm reaches Ith_1a, the output of comparator 344A corresponding to signal COMP<0> switches from an output of 1 to an output of 0. If the value of the current Ipfm stays between Ith_1a and Ith_1b for at least the detection time Tdetect, the frequency avoidance module sets the current source Ib_0b to output a current equal to Ith_1b to configure the oscillator to generate a clock signal having a switching frequency equal to the frequency corresponding to the lower boundary of the first stop band.

Referring back to FIG. 4A, as the value of the load current Iload increases 422, the value of the oscillator current IOSC increases accordingly. When the value of the oscillator current IOSC reaches Ith_1b from a value lower the Ith_1b, the frequency avoidance method raises 424 the value of oscillator current IOSC to Ith_1a until the value of current Ipfm moves outside of the range between Ith_1a and Ith_1b. In this manner, the frequency avoidance method prevents the oscillator from operating in a manner that would produce a clock signal with a frequency within the first stop band 430.

Figure 4C:
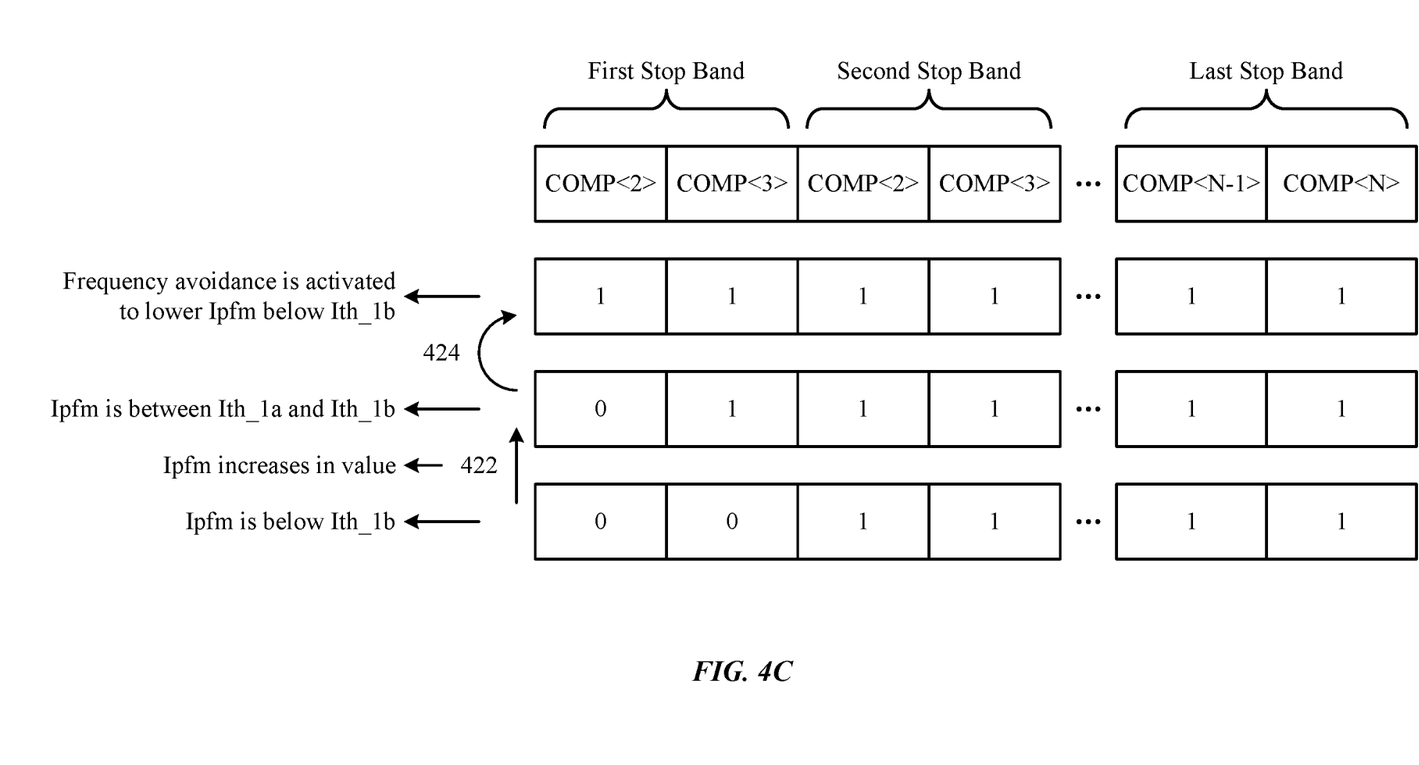
FIG. 4C is a diagram illustrating the value operation of the frequency avoidance control logic as the current oscillator current increases from below lower boundary of the first stop band to the first stop band, according to one embodiment.

FIG. 4C is a diagram illustrating the value operation of the frequency avoidance control logic 342 as the current oscillator current IOSC increases from below Ith_1b to the first stop band, according to one embodiment. As the load current increases and the switching frequency of the clock signal fclk increases, the value of current Ipfm reaches the threshold value Ith_1b corresponding to the lower boundary of the first stop band 430. When the current Ipfm reaches Ith_1b, the output of comparator 344B corresponding to signal COMP<1> switches from an output of 0 to an output of 1. If the value of the current Ipfm stays between Ith_1a and Ith_1b for at least the detection time Tdetect, the frequency avoidance module sets the current source Ib_0b to output a current equal to Ith_1a to configure the oscillator to generate a clock signal having a switching frequency equal to the frequency corresponding to the upper boundary of the first stop band.

Figure 5:
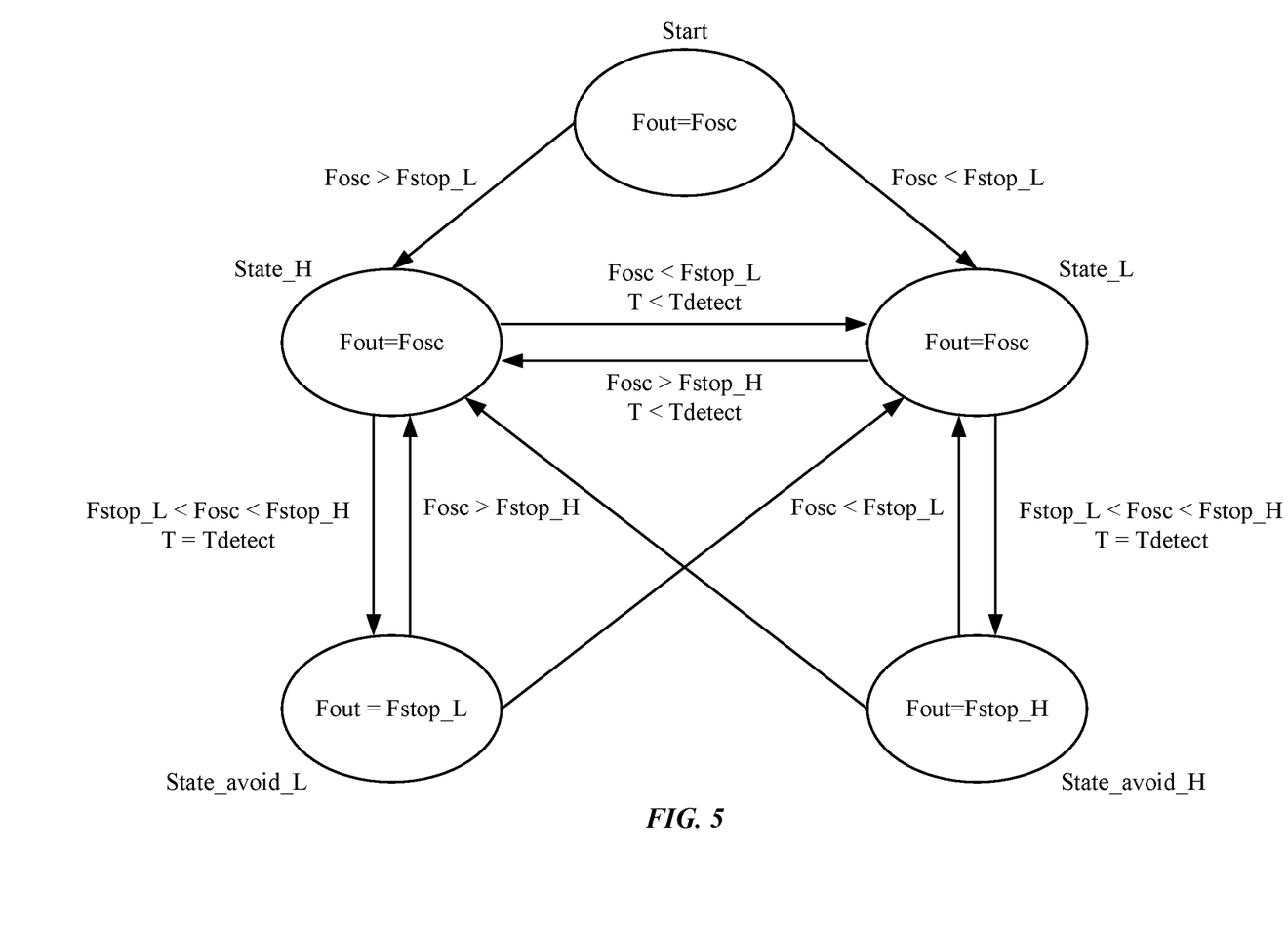
FIG. 5 is a state diagram of the operation of the frequency avoidance method with one stop band, according to one embodiment.

FIG. 5 is a state diagram of the operation of the frequency avoidance method with one stop band, according to one embodiment. The operation of the frequency avoidance method is represented as a finite state machine (FSM) having four main states, State_H, State_L, State_avoid_L, and State_avoid_H. In the state diagram of FIG. 5, the lower frequency boundary of the stop band is denoted as Fstop_L and the upper frequency boundary of the stop ban is denoted as Fstop_H. When the method starts, the FSM goes to either State_H or State_L depending on the value of the oscillator frequency. If the oscillator frequency is greater than Fstop_L, the FSM goes to State_H. Otherwise, if the oscillator frequency is lower than Fstop_L, the FSM goes to State_L. In other embodiments, the FSM may decide to start in State_H or State_L based on a comparison between the oscillator frequency and Fstop_H.

At State_H, the output frequency becomes the same as the oscillator frequency (Fout=Fosc) as long as the oscillator frequency stays higher than Fstop_H. If the frequency of the oscillator transitions to lower than Fstop_L in less time than Tdetect, the FSM transitions from State_H to State_L. When the FSM transitions from State_H to State_L, the output frequency stays the same as the oscillator frequency. However, if the oscillator frequency drops below Fstop_H but stays in the stop band (Fstop_L<Fosc<Fstop_H) for longer than Tdetect, the FSM transitions to State_avoid_L. At State_avoid_L, the output frequency is set to Fstop_L until Ipfm moves out of the current range that corresponds to the stop band frequency.

The FSM transitions from State_avoid_L to State_H when the oscillator frequency becomes higher than Fstop_H. Alternatively, the FSM transitions from State_avoid_L to State_L when the oscillator frequency becomes lower than Fstop_L.

At State_L, the output frequency becomes the same as the oscillator frequency (Fout=Fosc) as long as the oscillator frequency stays lower than Fstop_L. If the frequency of the oscillator transitions to higher than Fstop_H in less time that Tdetect, the FSM transitions from State_L to State_H. When the FSM transitions from State_L to State_H, the output frequency stays the same as the oscillator frequency. However, if the oscillator frequency rises above Fstop_L but stays in the stop band (Fstop_L<Fosc<Fstop_H) for longer than Tdetect, the FSM transitions to State_avoid_H. At State_avoid_H, the output frequency is set to Fstop_H until Ipfm moves out of the current range that corresponds to the stop band frequency.

The FSM transitions from State_avoid_H to State_L when the oscillator frequency becomes lower than Fstop_L. Alternatively, the FSM transitions from State_avoid_H to State_H when the oscillator frequency becomes higher than Fstop_H.

Example Process for Controlling Switching Regulator

Figure 6A:
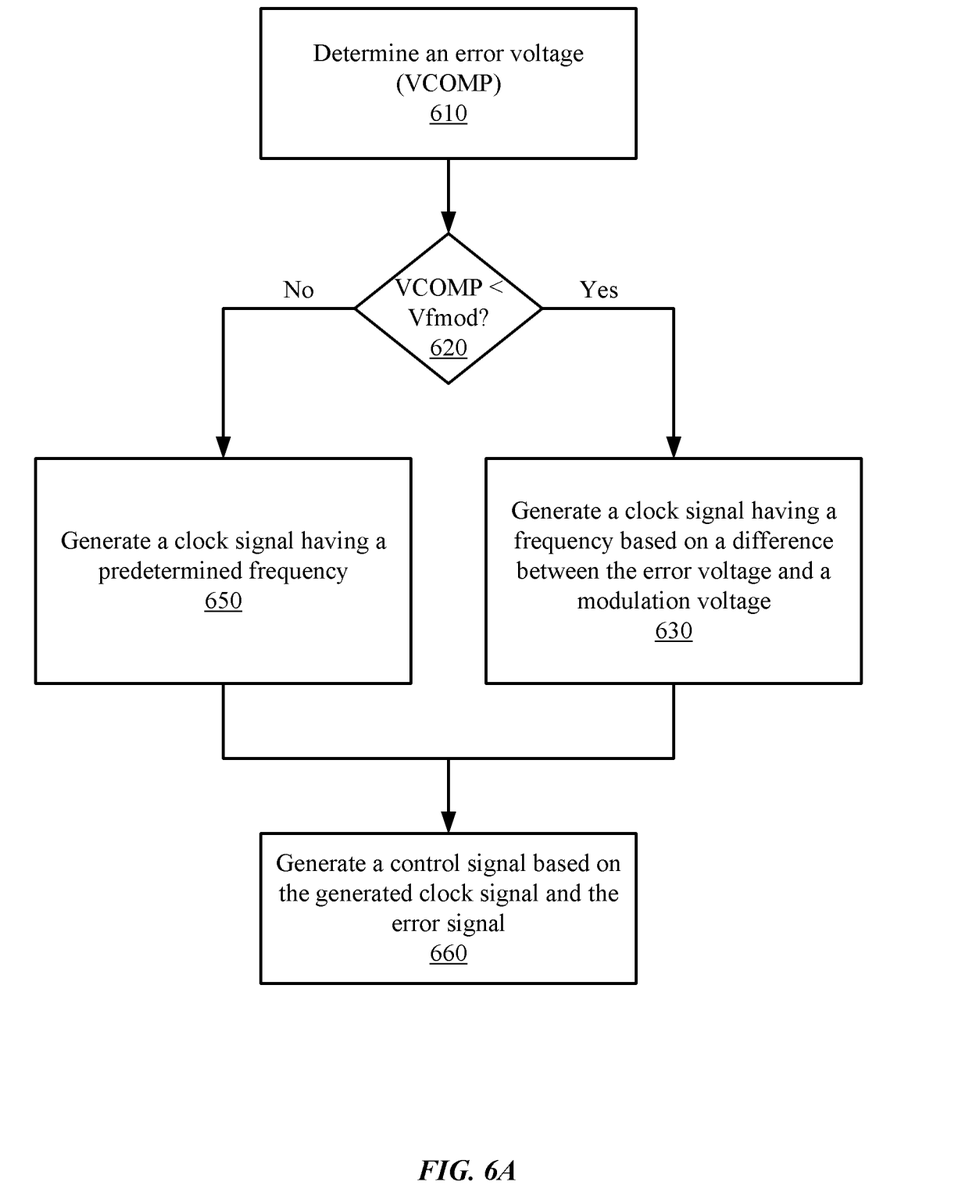
FIG. 6A is a flowchart illustrating a method for controlling the peak current mode buck regulator, according to one embodiment.

FIG. 6A is a flowchart illustrating a method for controlling the peak current mode buck regulator 210, according to one embodiments. The method may include additional or fewer steps, and steps may be performed in different orders.

The error amplifier 220, as described with reference to FIG. 3, determines 610 an error voltage VCOMP based on an output voltage VOUT of the power source 280. The PFM controller 240 generates 630 a clock signal fclk based on a comparison 620 between the error voltage VCOMP and a modulation voltage Vfmod. In particular, if the error voltage VCOMP is larger than the modulation voltage Vfmod, the PFM controller 240 generates 750 a clock signal having a predetermined frequency. Otherwise, if the error voltage VCOMP is lower than the modulation voltage Vfmod, the PFM controller 240 generates 630 a clock signal having a frequency based on the difference between the error voltage VCOMP and the modulation voltage Vfmod. A method for generating the clock signal is described in more detailed below in conjunction with FIG. 6B. Based on the generated clock signal, and an error signal that is based on a load current sensed at an output of the power source 280.

Figure 6B:
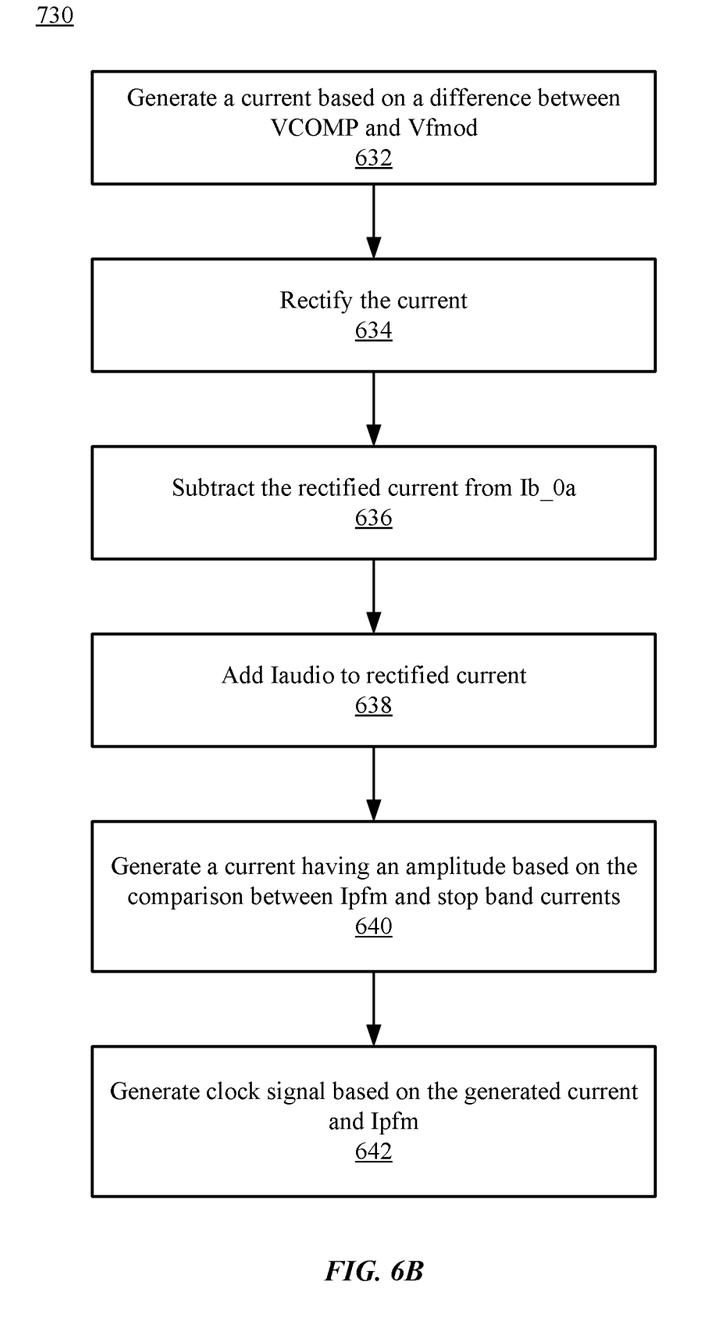
FIG. 6B is a flowchart illustrating a method for generating a clock signal, according to one embodiments.

FIG. 6B is a flowchart illustrating a method for generating a clock signal, according to one embodiments. The method may include additional or fewer steps, and steps may be performed in different orders.

A current is generated 632 based on a difference between the error voltage VCOMP and the modulation voltage Vfmod, and the current is rectified 634 to generate rectified current Irect. An intermediate current Ipfm is generated based on the rectified current. In some embodiments, to generate the intermediate current Ipfm, the rectified current Irect is subtracted from bias current Ib_0a. Moreover, in some embodiments, to generate the intermediate current Ipfm, an audio bias current Iaudio is added to the rectified current Irect.

The intermediate current Ipfm is compared to multiple stop band currents. Each stop band current corresponds to a boundary of a stop band. In some embodiments, for each stop band current, a determination is made whether the intermediate current is higher than the stop band current. Then a digital signal COMP<i> is generated. The digital signal COMP<i> has a first value (e.g., 0 or 1) if the intermediate current is higher than the stop band current. Conversely, the digital signal COMP<i> has a second value (e.g., 1 or 0) if the intermediate current is lower than the stop band current.

A current Ib_0b is generated 640 having an amplitude based on the comparison between the intermediate current Ipfm and each of the stop band currents. In some embodiments, to generate 640 current Ib_0b, a current source is activated when the comparison between the intermediate current Ipfm and the stop band currents indicate that the intermediate current Ipfm is between a first stop (e.g., Ith_1b) band current corresponding to a lower boundary of a stop band and a second stop band current (e.g., Ith_1a) corresponding to an upper boundary of the stop band. In some embodiments, a current source is activated when the comparison between the intermediate current Ipfm and the stop band currents indicate that the intermediate current Ipfm is between a first stop (e.g., Ith_1b) band current corresponding to a lower boundary of a stop band and a second stop band current (e.g., Ith_1a) corresponding to an upper boundary of the stop band for at least a predetermined amount of time.

Based on the generated current Ib_0b and the intermediate current Ipfm, a clock signal is generated 642. In some embodiments, the clock signal is generated by an oscillator 360 that adjusts the frequency of the output signal based on the amplitude of the input current.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A switching regulator comprising:
    an error amplifier configured to receive an output voltage of a power source, and configured to generate an error voltage based on a difference between the output voltage of the power source and a reference voltage;
    a pulse-frequency-modulation (PFM) controller configured to receive the error voltage from the error amplifier, and configured to generate a clock signal having a predetermined frequency responsive to the error voltage being larger than a modulation voltage, and a frequency based on a difference between the error voltage and a modulation voltage responsive to the error voltage being lower than the modulation voltage; and
    a pulse-width-modulation (PWM) controller configured to receive the clock signal and an error signal based on a load current sensed at an output of the power source, and generate a control signal to control the power source.

2. The switching regulator of claim 1, wherein the PFM controller comprises:
    a PFM circuit configured to generate a PFM current based on the difference between the error voltage and the modulation voltage, the PFM circuit comprising:
        a transconductance amplifier for generating an error current based on the difference between the error voltage and the modulation voltage,
        a rectifier for rectifying the error current, and
        current subtractor for subtracting the rectified error current from a reference current to generate a PFM current to configure an oscillator to generate a clock signal having a switching frequency controlled by a value of the PFM current.

3. The switching regulator of claim 2, wherein the current subtractor comprises:
    a first current mirror coupled to the rectified, the first current mirror configured to receive the rectified current and to generate a mirrored rectified current;
    a second current mirror, an input of the second current mirror coupled to an output of the first current mirror; and
    a current source coupled to the input of the second current mirror, the current source configured to generate the reference current.

4. The switching regulator of claim 2, wherein the PFM circuit further comprises:
    circuitry for adding an audio band avoidance current to the PFM current, the audio band avoidance current to prevent the oscillator from generating the clock signal having a switching frequency in an audible frequency spectrum.

5. The switching regulator of claim 2, wherein the PFM circuit further comprises:
    a clamp circuit coupled to an output of the error amplifier, the clamp circuit for preventing the output of the error amplifier from dropping below a clamp voltage level.

6. The switching regulator of claim 5, wherein the clamp circuit comprises:
    an amplifier configured to receive as inputs the clamp voltage and the error voltage, and generate an output based on a difference between the clamp voltage and the error voltage; and a switch having an output coupled to an output of the error amplifier, the switch configured provide a current based on the output of the amplifier of the clamp circuit, the switch configured to raise the error voltage when the error voltage drops below the clamp voltage.

7. The switching regulator of claim 2, wherein the PFM controller further comprises:
a frequency avoidance module configured to receive the PFM current and generate an oscillator current, the frequency avoidance module comprising:
a plurality of compare branches, each compare branch for comparing the PFM current to a stop band current, the stop band current corresponding to a boundary of a stop band, each compare branch comprising:
a current mirror for mirroring the PFM current, and
a comparator for determining whether the mirrored PFM current is lower than a corresponding stop band current;
a frequency avoidance controller configured to receive an output of each of the compare branches, and configured to generate a control signal for configuring a frequency avoidance current source to generate a frequency avoidance current; and
an output current mirror configured to generate the oscillator current based on the PFM current and the current of the frequency avoidance current.

8. The switching regulator of claim 7, wherein the frequency avoidance controller is configured to activate the frequency avoidance current source when the output of the compare branches indicate that the PFM current is between a first current corresponding to a lower boundary of a stop band and a second current corresponding to an upper boundary of the stop band.

9. The switching regulator of claim 8, wherein the frequency avoidance controller is configured to activate the frequency avoidance current source when the output of the compare branches indicate that the PFM current is between the first current corresponding to a lower boundary of the stop band and the second current corresponding to an upper boundary of the stop band for at least a predetermined amount of time.

10. A frequency avoidance circuit comprising:
a plurality of compare branches, each compare branch for comparing an input current to a stop band current, the stop band current corresponding to a boundary of a stop band, each compare branch comprising:
a current mirror for mirroring the input current, and
a comparator for determining whether the mirrored input current is lower than a corresponding stop band current;
a frequency avoidance controller configured to receive an output of each of the compare branches, and configured to generate a control signal for configuring a frequency avoidance current source to generate a frequency avoidance current; and
an output current mirror configured to generate an oscillator current based on the input current and the current of the frequency avoidance current.

11. The frequency avoidance circuit of claim 10, wherein the frequency avoidance controller is configured to activate the frequency avoidance current source when the output of the compare branches indicate that the input current is between a first current corresponding to a lower boundary of a stop band and a second current corresponding to an upper boundary of the stop band.

12. The frequency avoidance circuit of claim 10, wherein the frequency avoidance controller is configured to activate the frequency avoidance current source when the output of the compare branches indicate that the input current is between a first current corresponding to a lower boundary of a stop band and a second current corresponding to an upper boundary of the stop band for at least a predetermined amount of time.

13. A method for controlling a switching regulator, comprising:
determining an error voltage by comparing an output of a power source and a reference voltage;
generating a clock signal having a predetermined frequency if the error voltage is larger than a modulation voltage, and a frequency based on a difference between the error voltage and a modulation voltage if the error voltage is lower than the modulation voltage;
generating an error signal based on a load current sensed at an output of the power source; and
generating a control signal based on the generated clock signal and the error signal.

14. The method of claim 13, wherein generating the clock signal comprises:
generating a rectified current by rectifying an output of a transconductance amplifier, the transconductance amplifier receiving as inputs the error voltage and the modulation voltage.

15. The method of claim 14, wherein generating the clock signal further comprises:
generating an intermediate current by adding an audio band avoidance current to the rectified current, the audio band avoidance current for preventing an oscillator from generating a clock signal having a switching frequency in an audible frequency spectrum.

16. The method of claim 14, wherein generating the clock signal further comprises:
generating an intermediate current by subtracting the rectified current from a reference current, the intermediate current for configuring an oscillator to generate a clock signal having a switching frequency controlled by a value of the intermediate current.

17. The method of claim 16, wherein generating the clock signal further comprises:
comparing the intermediate current to a plurality of stop band currents, each stop band current corresponding to a boundary of a stop band;
configuring a current source to generate a current having an amplitude based on the comparison between the intermediate current and the plurality of stop band currents; and
generating the clock signal based on the current generated by the current source and the intermediate current.

18. The method of claim 17, wherein comparing the intermediate current to a stop band current comprises:
determining whether the intermediate current is higher than the stop band current; and
generating a digital signal having a first value when the intermediate current is higher than the stop band current, and having a second value when the intermediate current is lower than the stop band current.

19. The method of claim 17, wherein configuring a current source comprises:
activating the current source when the comparison between the intermediate current and the plurality of stop band currents indicate that the intermediate current is between a first stop band current corresponding to a lower boundary of a stop band and a second stop band current corresponding to an upper boundary of the stop band.

20. The method of claim 17, wherein configuring a current source comprises:
activating the current source when the comparison between the intermediate current and the plurality of stop band currents indicate that the intermediate current is between a first stop band current corresponding to a lower boundary of a stop band and a second stop band current corresponding to an upper boundary of the stop band for at least a predetermined amount of time.

\* \* \* \* \*

UNITED STATES PATENT AND TRADEMARK OFFICE
CERTIFICATE OF CORRECTION

PATENT NO. : 11,342,842 B2
APPLICATION NO. : 16/805577
DATED : May 24, 2022
INVENTOR(S) : Ozalevli et al.

It is certified that error appears in the above-identified patent and that said Letters Patent is hereby corrected as shown below:

In the Claims

In Column 11, in Claim 6, Line 2, delete "configured" and insert -- configured to --, therefor.

Signed and Sealed this
Thirtieth Day of August, 2022

Katherine Kelly Vidal
*Director of the United States Patent and Trademark Office*